DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 275

T904,025

ANTISOILING ALUMINA COATINGS FOR POROUS SURFACES

Leonard J. Schuman, Parsippany, and Raymond T. Ertle, Pompton Plains, N.J., assignors to Continental Oil Company, Ponca City, Okla.

Filed Jan. 7, 1972, Ser. No. 216,267
Int. Cl. B32b *27/06;* B44d *5/00*
U.S. Cl. 117—138.8 UA
No Drawing. 5 Pages Specification

A method for applying an antisoiling alumina coating to porous surfaces by applying a mixture containing from about 6 to about 9 weight percent dispersible alumina; from about 0.6 to about 1.0 weight percent acid selected from monofunctional organic acids containing from 1 to about 4 carbon atoms, halogenated monofunctional organic acids containing from about 2 to about 4 carbon atoms and mineral acids; about 18 to about 25 weight percent non-dispersible alumina and about 75.4 to about 65 weight percent water to provide an antisoiling coating. A preferred acid is monochloroacetic acid and a preferred mixture contains from about 7 to 8 weight percent dispersible alumina, about 0.7 to about 0.9 weight percent monochloroacetic acid, about 20 to about 23 weight percent non-dispersible alumina and about 72.2 to about 69 weight percent water. In an example a mixture of 7.7 weight percent "Dispal" dispersible alumina, 0.7 weight percent monochloroacetic acid, 23.0 weight percent "Conopal" non-dispersible alumina and 68.6 weight percent water was used to apply an alumina coating to acrylic foam-backed material.